United States Patent [19]
Oak et al.

[11] 3,774,691
[45] Nov. 27, 1973

[54] ROW MARKER LIFT DEVICE

[76] Inventors: Ernest R. Oak; Lowell T. Oak, both of Park River, N. Dak. 58270

[22] Filed: Aug. 14, 1972

[21] Appl. No.: 280,660

[52] U.S. Cl. ............................................. 172/130
[51] Int. Cl. ........................................... A01b 17/00
[58] Field of Search .....................................
172/126–132; 74/89.12, 422

[56] References Cited
UNITED STATES PATENTS

| | | | |
|---|---|---|---|
| 3,575,242 | 4/1971 | Olsson | 172/130 |
| 3,450,210 | 6/1969 | Smith | 172/130 |
| 2,410,643 | 11/1946 | Fielding | 74/422 |
| 3,621,939 | 11/1971 | Hughes | 74/422 X |
| 3,670,823 | 6/1972 | Matthews et al. | 172/130 X |
| 1,888,502 | 11/1932 | Holstein | 172/130 |

*Primary Examiner*—Robert E. Pulfrey
*Assistant Examiner*—R. T. Rader
*Attorney*—Williamson, Bains & Moore

[57] ABSTRACT

A row marker lift device includes a double groove cable pulley, about which is trained the lift cable for the row markers. A double acting hydraulic ram has a rack secured to its piston rod, and the rack engages a pinion which is secured to the cable pully axle. Extension and retraction of the hydraulic ram rotates the pulley selectively in opposite directions for raising and lowering the row markers.

3 Claims, 4 Drawing Figures

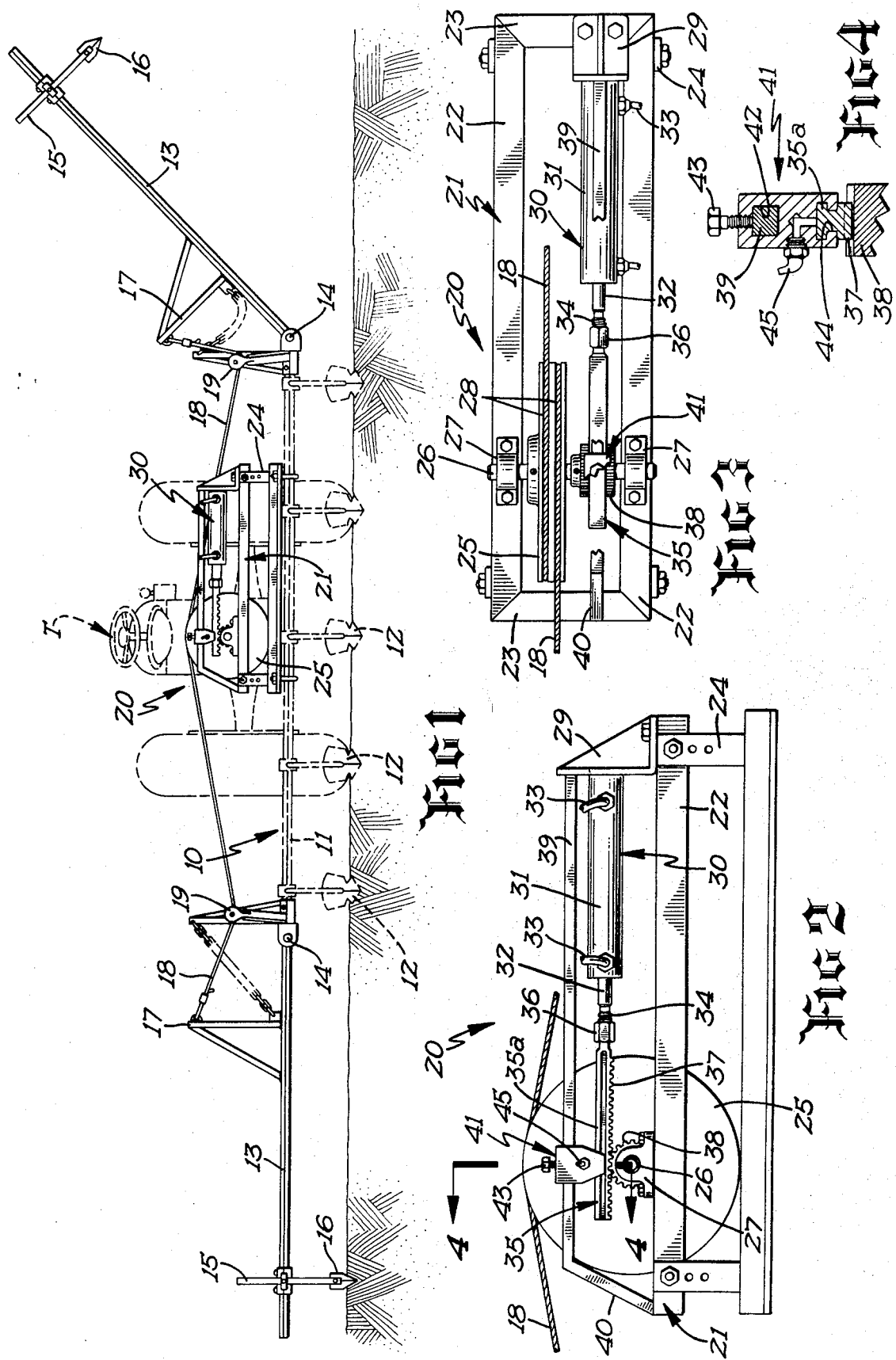

ROW MARKER LIFT DEVICE

SUMMARY OF THE INVENTION

The present invention relates to a power means for alternately lifting and lowering row markers which are mounted on an agricultural implement or the like.

In most commercially available row marker apparatus, the row marker arms are connected to cables which are mechanically, usually manually, controlled by an operator. Therefore this alternate raising and lowering of the row markers by an operator involves a laborious operation.

It is therefore a general object of this invention to provide a power operated lift device for raising and lowering the row markers. Specifically, the lift cable is trained about a double groove pulley which is power rotated in opposite directions by a hydraulic ram unit and this alternate rotation of the cable pulley alternately raises and lowers the row markers. A rack and pinion drive connection is interposed between the hydraulic ram unit and cable pulley, and with this arrangement, an operator may easily raise and lower the row markers by merely operating a valve which may be conveniently located on the tractor. These and other objects etc.

BRIEF DESCRIPTION OF THE DRAWINGS

FIG. 1 is a rear elevational view of the novel lift device incorporated with a row marker apparatus which is mounted on a tractor-drawn implement;

FIG. 2 is a rear elevational view of the lift device,

FIG. 3 is a top plan view thereof, and

FIG. 4 is a vertical sectional view taken approximately along line 4—4 of FIG. 2 and looking in the direction of the arrows.

DETAILED DESCRIPTION

Referring now to the drawings and more specifically to FIG. 1, it will be seen that an agricultural implement 10 is illustrated in towed relation with respect to a tractor T. The tractor propelled implement 10 includes an implement frame 11 having a plurality of earth working tools, such as the plows 12, depending therefrom in a well known manner.

The implement 10 is provided with a row marker apparatus including right hand and left hand row marker arms 13, each being pivotally connected at its inner end by a pivot 15 to the implement frame 11 adjacent one side thereof. Each row marker arm 13 is provided with a standard 15 which is secured thereto adjacent the outer end thereof by a suitable clamp, and each standard has a marker plow 16 secured to its lower end. It is also pointed out that any convenient marking device such as a disc marker may also be used. Each marker arm 13 is also provided with a post 17 secured thereto and projecting upwardly therefrom intermediate the ends of the marker arm. The post 17 for each marker arm may be provided with a suitable diagonal brace and an elongate lift cable 18 has opposite ends thereof secured to the posts 17. The cable 18 is trained about a pair of pulleys 19, each being located adjacent the outer portion of the implement frame 11.

Cable 18 is also operatively connected with the lift device, designated generally by the reference numeral 20, the latter being mounted on the implement frame 11. The lift device 20 includes a frame 21 comprised of a pair of longitudinal frame members 22 which are disposed in spaced apart parallel relation and which are rigidly affixed to end or transverse frame members 23. Thus it will be noted that the frame 21 is of generally rectangular configuration. Each longitudinally frame member 22 has a pair of legs 24 fixedly secured thereto and depending therefrom, the legs being secured to the implement frame 11.

A vertical disposed cable pulley 25 is positioned between the longitudinal frame members 22 and the axle 26 of the cable is journeled in suitable pillow bearings 27 each being mounted on one of the lingitudinal frame members 22. It will be noted that the cable pulley 25 has a pair of circumferential cable grooves 28 therein, and the cable 18 is trained about and positioned in the grooves 28 as best seen in FIG. 3. It will therefore be noted that when the cable 25 is rotated in one direction, a portion of the cable 18 between the pulley and one of the marker arms will be tensioned while the other portion of the cable between the pulley and the other marker arm will be untensioned. This allows one marker arm to be raised while the other marker arm is lowered.

A bracket 29 is mounted on one of the end or transverse frame members 23 and projects upwardly therefrom. A double acting hydraulic ram unit 30 is mounted on the bracket 29 and projects outwardly therefrom. This hydraulic ram unit 30 includes a hydraulic cylinder 31 which is actually secured to the bracket 29, and which has a piston (not shown) movable therein to which is attached a piston rod 32. A pair of conduits 33 are connected to the cylinder 31 in communicating relation therewith, and the conduits are also connected to a source of hydraulic fluid under pressure such as a pump for the hydraulic system of the tractor T.

An elongate rack 35 has a nut 36 secured to one end thereof and this nut threadedly engages the threaded end portion 34 of the piston rod 32. It will be noted that the rack which has an upper portion 35a of T-shaped cross sectional configuration, as best seen in FIG. 4, also has teeth 37 throughout substantially the entire length thereof. These teeth 37 mesh with the teeth of a pinion or gear 38 which is mounted on axle 26 of the cable pulley 25. It will therefore be seen that when the piston rod 32 is extended, the pulley 25 will be rotated in one direction and when the piston rod is retracted the cable pulley will be rotated in the opposite direction.

Means are provided for guiding and maintaining the rack 35 in meshing relation with the pinion 38, and to this end, an elongate mounting bar 39 is fixedly secured to the upper portion of bracket 29 and projects laterally therefrom. It will be noted that the bar 39 is disposed above the frame 21 and substantially parallel thereto and has an end portion 40 angularly depending from the bar and fixedly connected to one of the end frame members 23. A guide member 41 has a rectangular opening 42 therein through which projects the bar 39. A set screw 43 threadedly engages a threaded recess in the guide member and engages the bar to selectively position the guide member in a preset location along the bar 39. The guide 41 also has a T-shaped opening 44 therein throughwhich projects the upper portion 35a of the rack 35. The guide member 41 may be provided with a lubricating fitting 45 which communicates with the T-shaped opening 44 to permit a lubricant to be provided as desired.

In use, the lift device 20 may be operated from the tractor by means of a valve V having an operating handle H. The valve V is connected in flow controlling relation with the hydraulic system of the tractor to which is connected the conduits 33. Therefore when the operator desires to raise one marker arm while alternately lowering the other marker arm, the valve handle H will be shifted in one direction therefore causing extension of the piston rod 32 from its retracted position, as shown in FIG. 2, to an extended position. This rotates the cable pulley 25 in one direction and causes one portion of the cable to be tensioned while the other portion is untensioned. This operation results in one marker arm being raised and the other arm lowered. Thereafter, the operator may then actuate the valve V to retract the piston rod 32 and cause rotation of the cable pulley in the opposite direction thereby raising the marker arm which is then in the lowered position and lowering the raised marker arm. Thus the power shifting of the marker arms may be easily accomplished from the tractor by merely actuating the valve V. The simple rectilinear motion of the hydraulic cylinder is readily converted to rotary motion by means of the rack and pinion drive connection. The entire lift device 20, including the cable pulley 25, may be readily mounted on any conventional implement and utilizes for its power, the conventional hydraulic system of most conventional tractors.

Although the rack and pinion drive connection is the preferred means of interconnecting the double acting hydraulic ram unit with the double groove pulley, other drive connections may also be used. It is also pointed out that the row marker apparatus has been only diagrammatically illustrated and the row marker apparatus will be provided with a cable for retaining the arms in an elevated position for travel in a well known manner.

From the foregoing description, it will be seen that the novel lift device may be readily mounted on any conventional implement and serves to power raise and lower the marker arms by merely operating a valve located on the tractor. It will further be seen that by utilizing a double grooved cable pulley, a very simple and effective means for raising and lowering the marker arms is utilized.

Thus it will be seen that I have provided an novel lift device for row markers, which is not only of simple and inexpensive construction, but one which functions in a more efficient manner than any heretofore known comparable lift device.

What is claimed is:

1. A row marker lift device for alternately raising and lowering the right hand and left hand elongate row markers pivotally mounted on a tractor-drawn mobile implement, said device comprising;

an elongate cable having one end thereof connected to the right hand row marker and having its other end connected to the left hand row marker, a cable pulley having an axle, mounting means on said implement revolvably mounting said cable pulley on the implement for rotation about an axis fixed relative to said implement and extending longitudinally of the implement and substantially parallel to the pivotal axis of the row markers, said cable pulley having a pair of cable grooves therein, said cable being trained about said pulley and said grooves, a pulley operating pinion mounted on said pulley axle for rotation with the axle in either a first or second direction, a double acting hydraulic ram including a cylinder connected to a source of hydraulic fluid under pressure, a piston and piston rod in said cylinder for retraction and extension relative thereto, an elongate rack connected to one end of said piston rod and projecting longitudinally therefrom, said rack having teeth along one longitudinal edge thereof in constant mesh with said pinion, said rack being operable when said piston rod is extended to drive said pinion and to rotate said pulley in one direction to raise one row marker, and lower the other, and when said piston rod is retracted, said rack driving said pinion and pulley in the opposite direction to cause lowering of said one row marker and raising of the other row marker.

2. The row marker lift device as defined in claim 1 and a guide element engaging said rack and cooperating with said pinion for guiding said rack during movement thereof.

3. The row marker lift device as defined in claim 2 wherein said rack has a portion thereof which is of T-shaped cross sectional configuration, and said guide element has a T-shaped recess therein through which said rack projects.

* * * * *